N. MESSENGER & J. ERWIN.
CULTIVATOR.

No. 191,990. Patented June 12, 1877.

UNITED STATES PATENT OFFICE.

NELSON MESSENGER AND JAMES ERWIN, OF NEWARK, ILLINOIS.

IMPROVEMENT IN CULTIVATORS.

Specification forming part of Letters Patent No. 191,990, dated June 12, 1877; application filed September 29, 1876.

*To all whom it may concern:*

Be it known that we, N. MESSENGER and JAMES ERWIN, of Newark, in the county of Kendall and State of Illinois, have invented certain new and useful Improvements in Cultivators; and we do hereby declare that the following is a full, clear, and exact description thereof, reference being had to the acompanying drawing, and to the letters of reference marked thereon.

The nature of our invention consists in the construction and arrangement of a cultivator adapted for the working of corn or other cereals, as will be hereinafter more fully set forth.

In order to enable others skilled in the art to which our invention appertains to make and use the same, we will now proceed to describe its construction and operation, referring to the annexed drawing, which forms a part of this specification, and in which—

Figure 1:
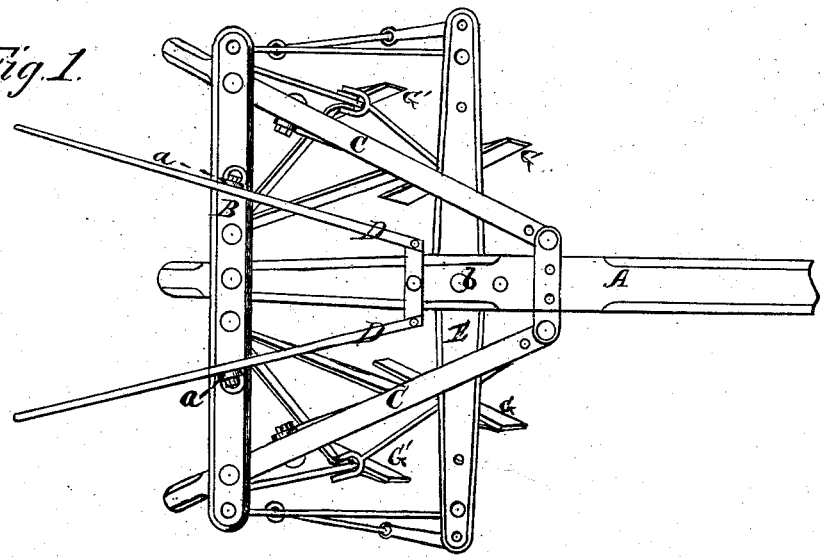
Figure 2:
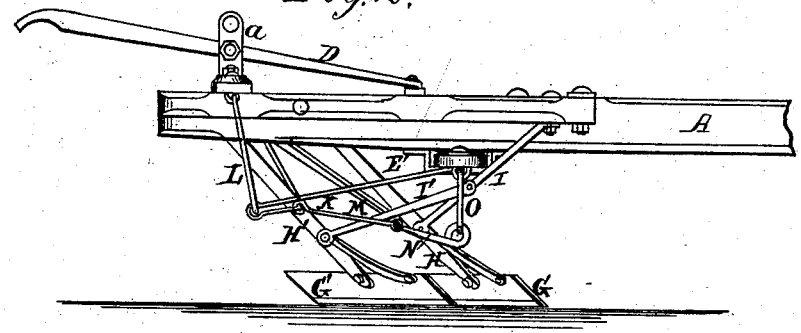

Figure 1 is a plan view of our cultivator. Fig. 2 is a side elevation; and Fig. 3, a rear view of the same.

A represents the pole of the cultivator, having a cross-bar, B, secured to it at or near its rear end. C C are two inclined side-beams, connected at their front ends by means of suitable metal plates or fastenings to the pole A— one on each side—and by ordinary bolts to the under side of the cross-bar B—one at or near each end. D D are the handles, having their front ends attached to the pole in any suitable manner and a convenient distance in front of the cross-bar B, the center parts of said handles being adjustably attached to lugs *a a*, which are bolted to the cross-bar B.

The rear ends of the handles D D project in rear of the cross-bar B in such a manner as to be conveniently grasped by the operator, and, being adjustable on the lugs *a a*, they can easily be raised or lowered, as required, to suit the height of the operator.

E represents the double-tree, which is passed through a loop, E', bolted to the under side of the pole, and a pin, *b*, is passed through the pole, double-tree, and loop for pivoting the double-tree.

Figure 3:
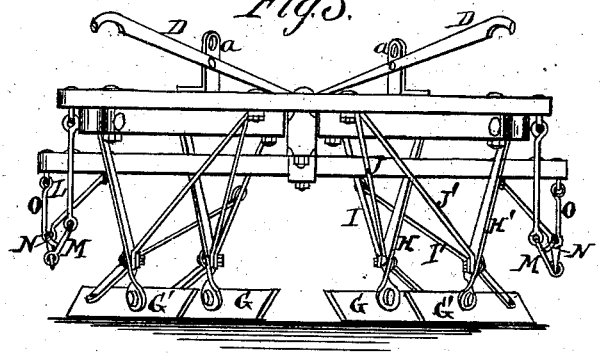

On each side of the frame-work thus constructed are two plow-blades, G and G', attached, respectively, to the lower ends of the plow shanks or standards H and H', the upper ends of said shanks or standards being attached to the inclined side-beam C. The front standard H is, just above the plow G, by means of a draft-rod, I, connected with the front end of the beam C; and to this draft-rod I is attached another draft-rod, I', connecting with the rear plow-shank or standard H', as shown, whereby said plow-shanks or standards are held firmly in position as the cultivator is drawn forward. The two plow-shanks or standards H H' are, on their inner sides, further, by brace-rods J J', respectively, connected with the cross-bar B near the pole, the upper ends of said brace-rods J J' being connected with the cross-bar by one and the same bolt, as seen in Fig. 3.

Near each end of the double-tree E is attached a bar, K, and the rear end of this bar is, by a link, L, connected with the under side of the cross-bar B, the link being attached to the cross-bar by a suitable loop and eyebolt. The rear end of the bar K, which is connected with the link L, is extended through a loop or eye formed in the lower end of said link, and is then bent forward, and a loop or eye in the extreme end forms an attachment for the draft rod or chain M, the front end of which has a hook or clevis, N, connected to the lower end of a V-shaped brace, O. The upper end of this brace is attached to the under side of the double-tree E by means of eyebolts in such a manner as to allow said brace to have a slight backward and forward swinging motion, but at the same time to hold the brace rigidly against any transverse motion.

The draft being applied to the hooks or clevises N N at the front ends of the rods or chains M M, the action of the draft will be to raise the pole up from off the horses' necks through the medium of said braces pressing up against the double-tree, which acts to raise the pole up.

This construction will greatly relieve the work upon the animals, and will also insure a proper and efficient working of the machine.

Having thus fully described our invention, what we claim as new, and desire to secure by Letters Patent, is—

The combination, with the pole A, stationary cross-bar B, and pivoted double-tree E, of the V-shaped brace O, draft-rod K, link L, rod or chain M, and hook or clevis N, all constructed and arranged substantially as and for the purposes herein set forth.

NELSON MESSENGER.
JAMES ERWIN.

Witnesses:
  A. R. NIBLO,
  SANFORD ROBINSON.